O. P. OSTERGREN.
METHOD AND APPARATUS FOR GENERATING MOTIVE POWER.
APPLICATION FILED JUNE 15, 1907.
986,308.
Patented Mar. 7, 1911.
10 SHEETS—SHEET 1.
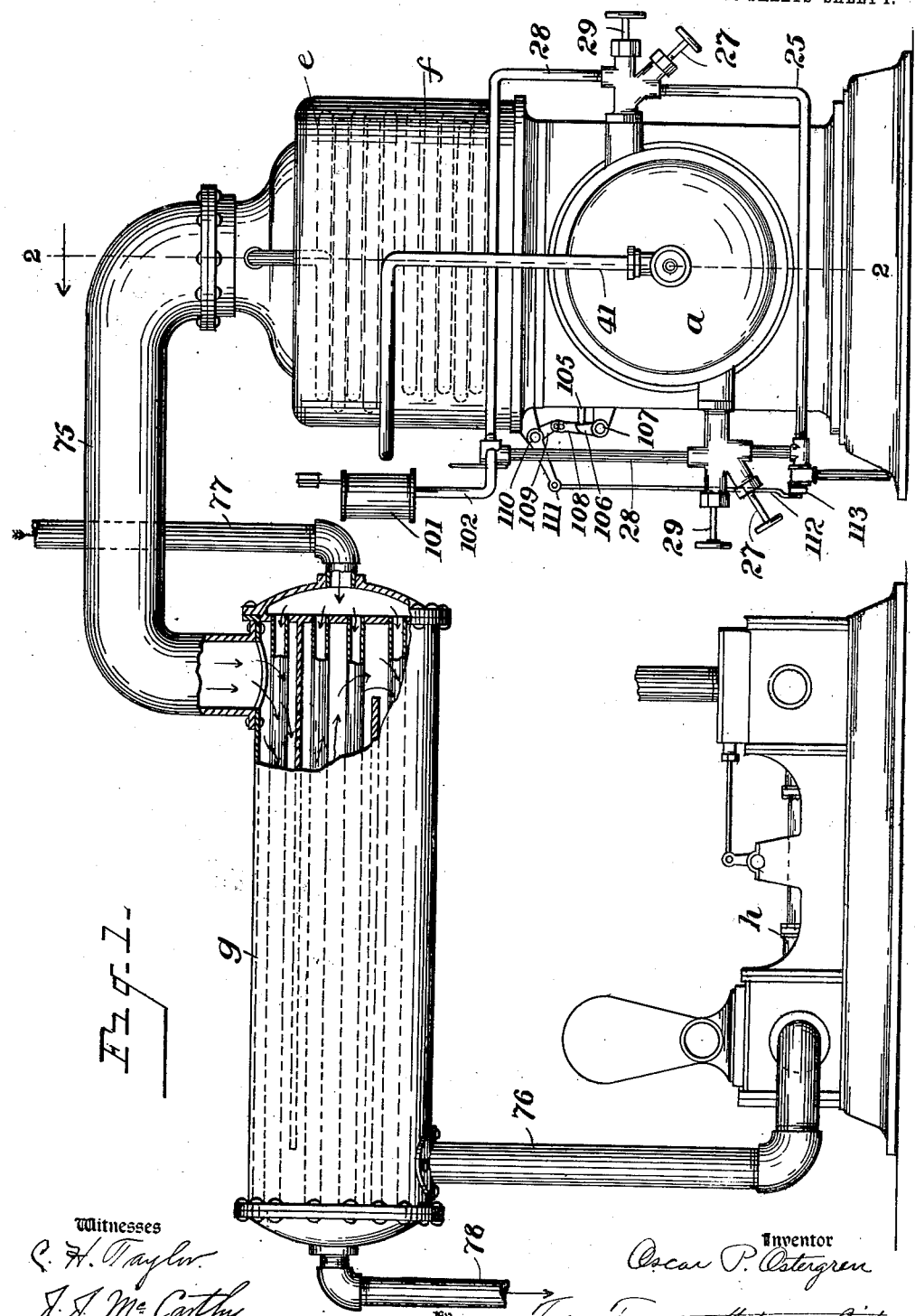
Witnesses
C. H. Taylor
J. J. McCarthy
Inventor
Oscar P. Ostergren
By Foster Freeman Watson + Coit
Attorneys

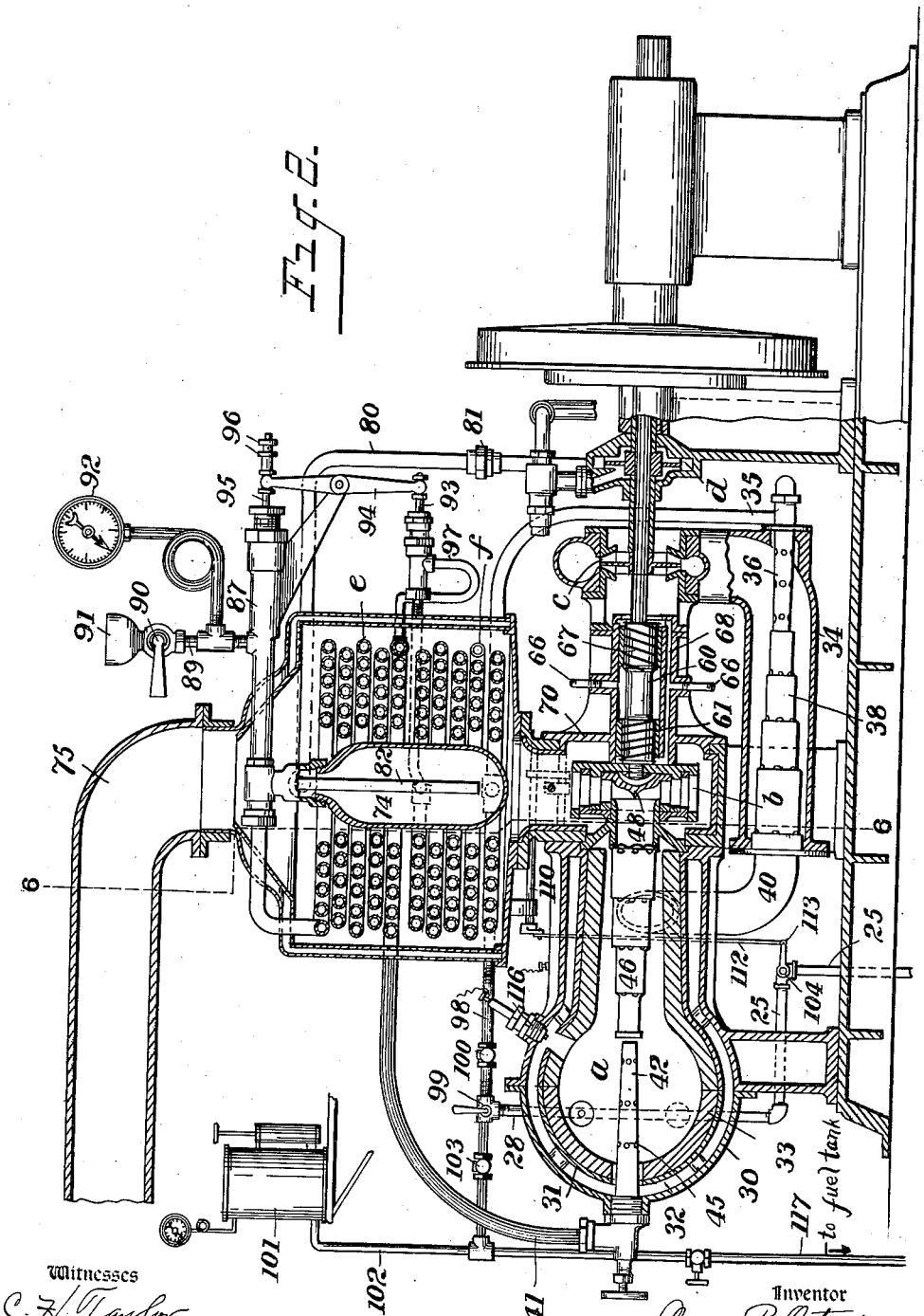

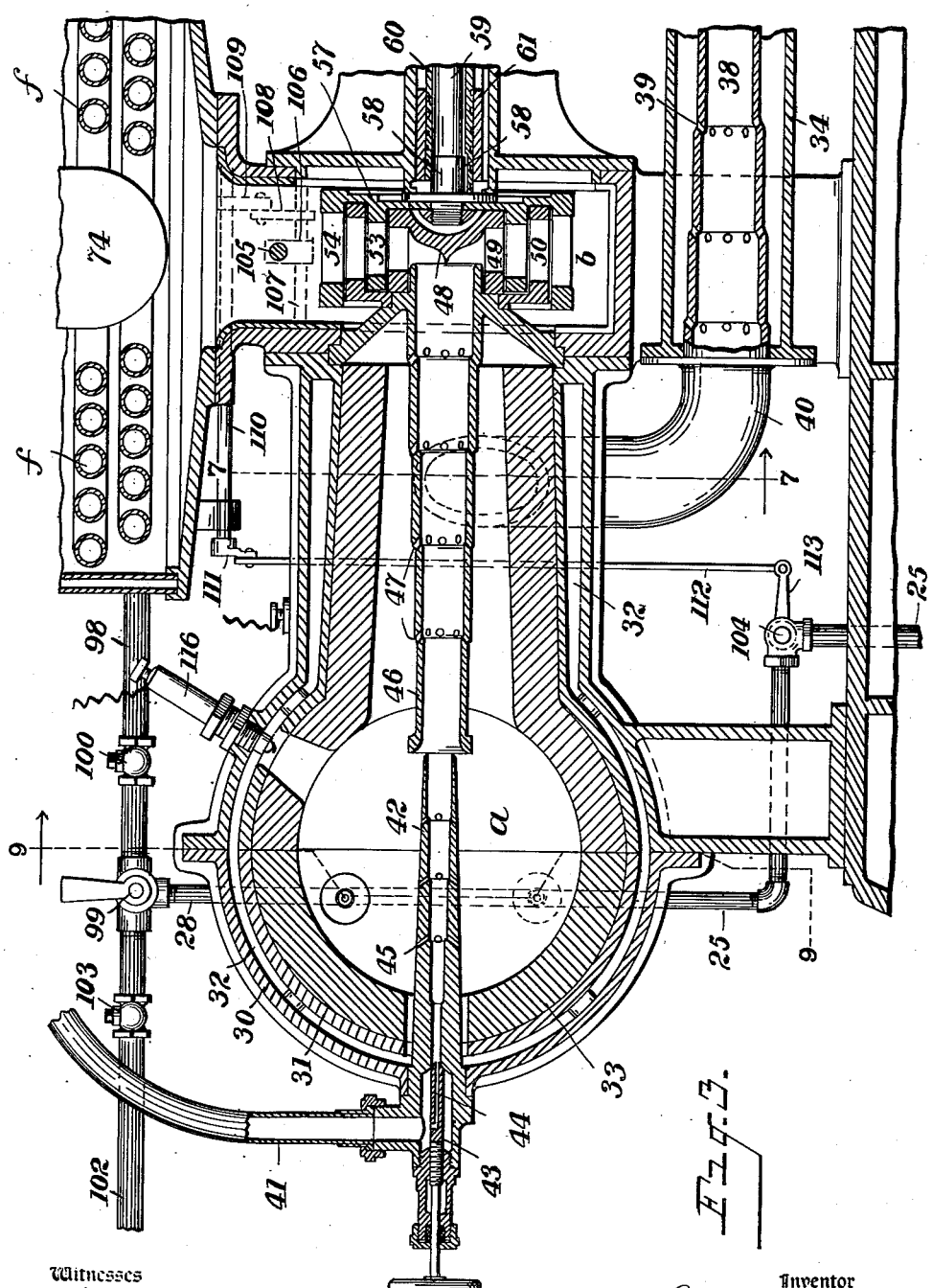

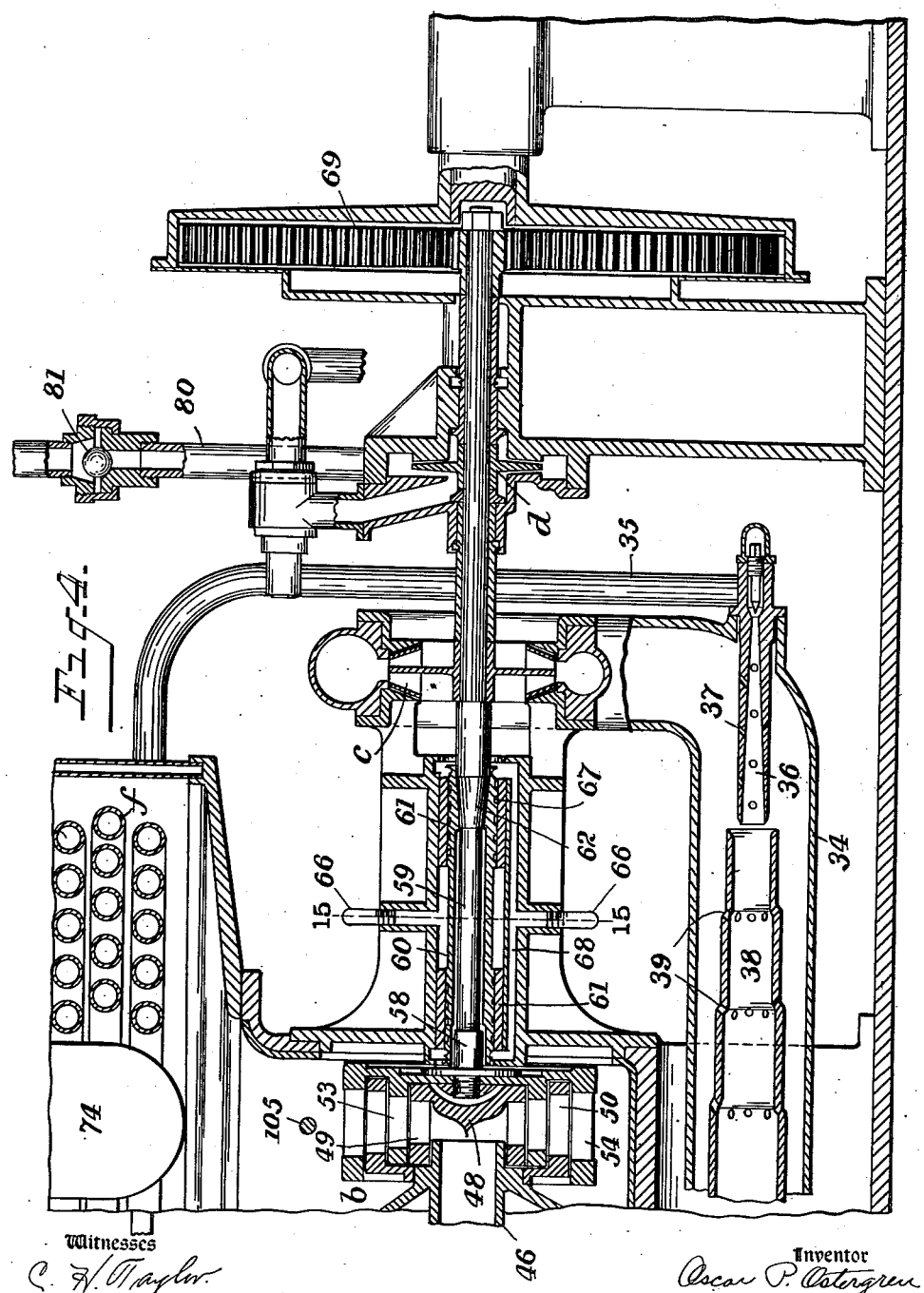

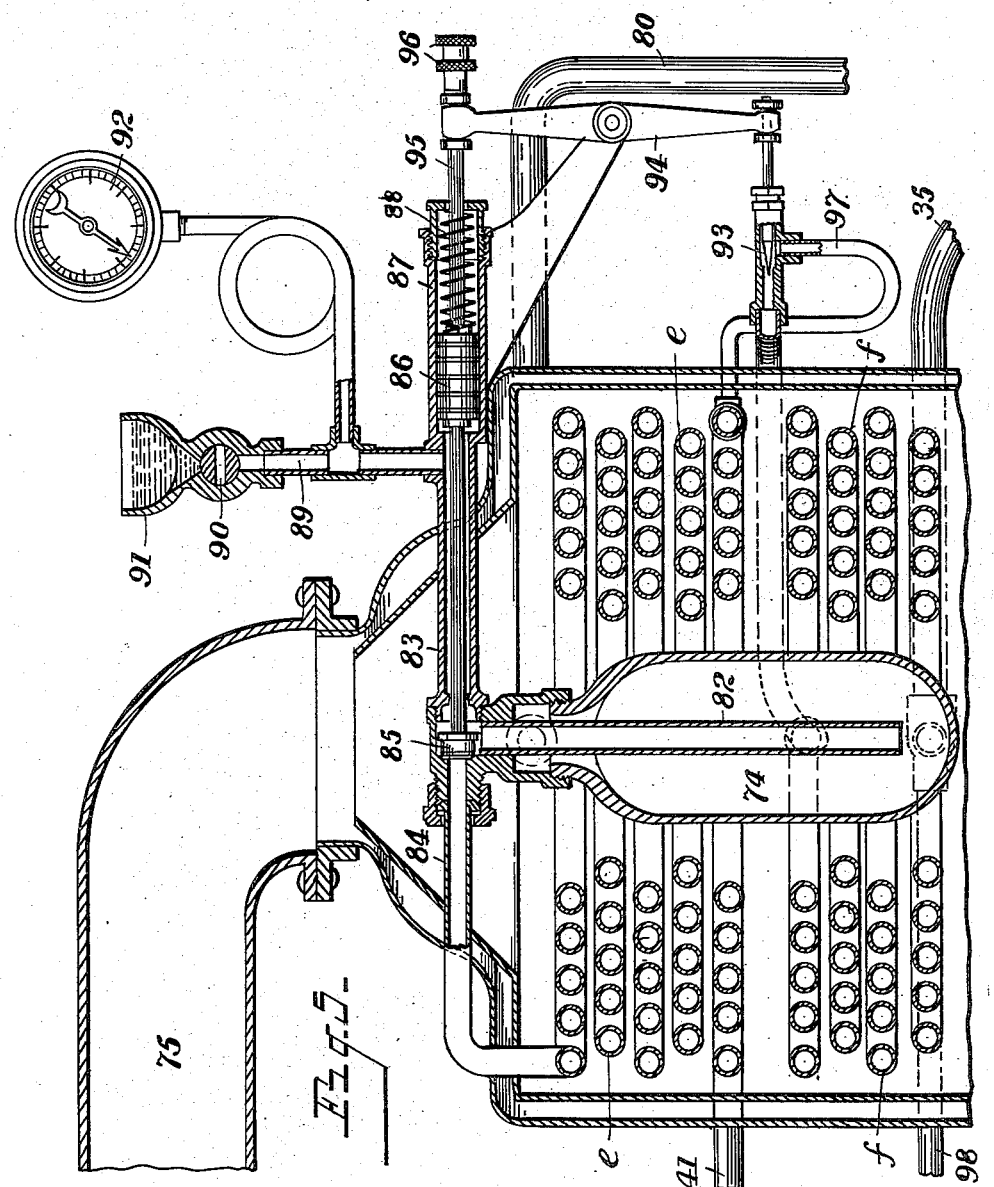

O. P. OSTERGREN.
METHOD AND APPARATUS FOR GENERATING MOTIVE POWER.
APPLICATION FILED JUNE 15, 1907.
986,308.
Patented Mar. 7, 1911.
10 SHEETS—SHEET 6.
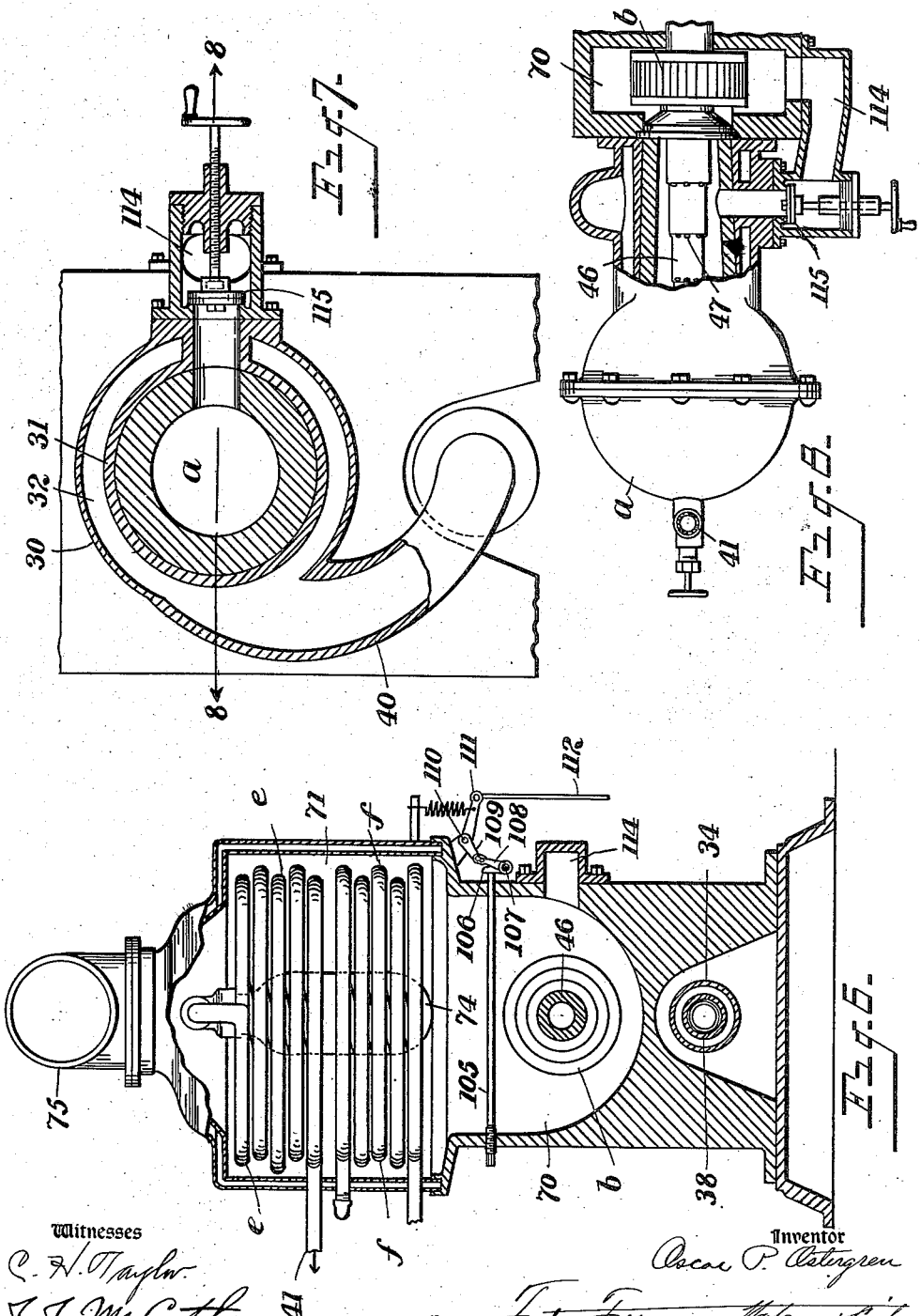

O. P. OSTERGREN.
METHOD AND APPARATUS FOR GENERATING MOTIVE POWER.
APPLICATION FILED JUNE 15, 1907.
986,308.
Patented Mar. 7, 1911.
10 SHEETS—SHEET 7.
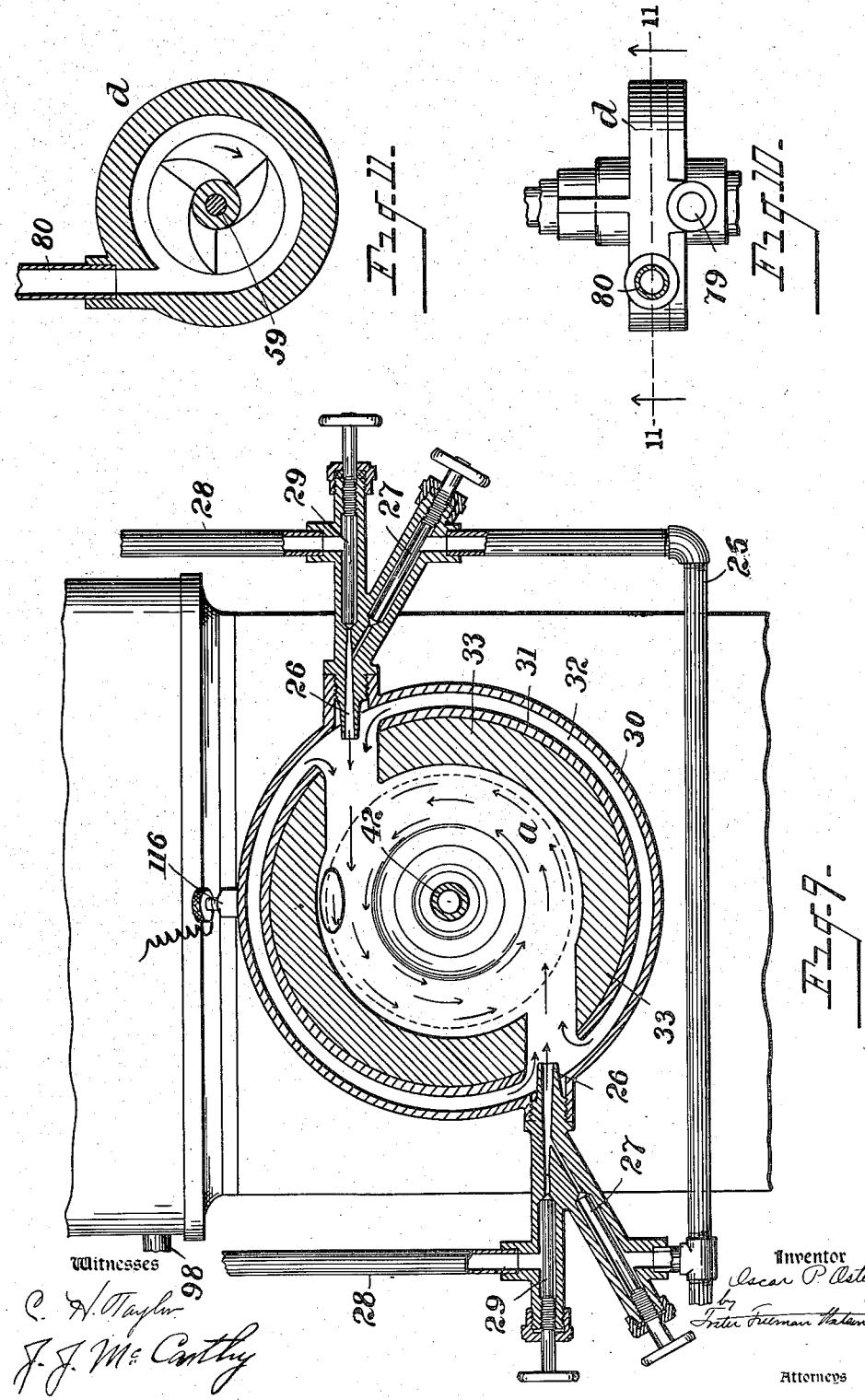

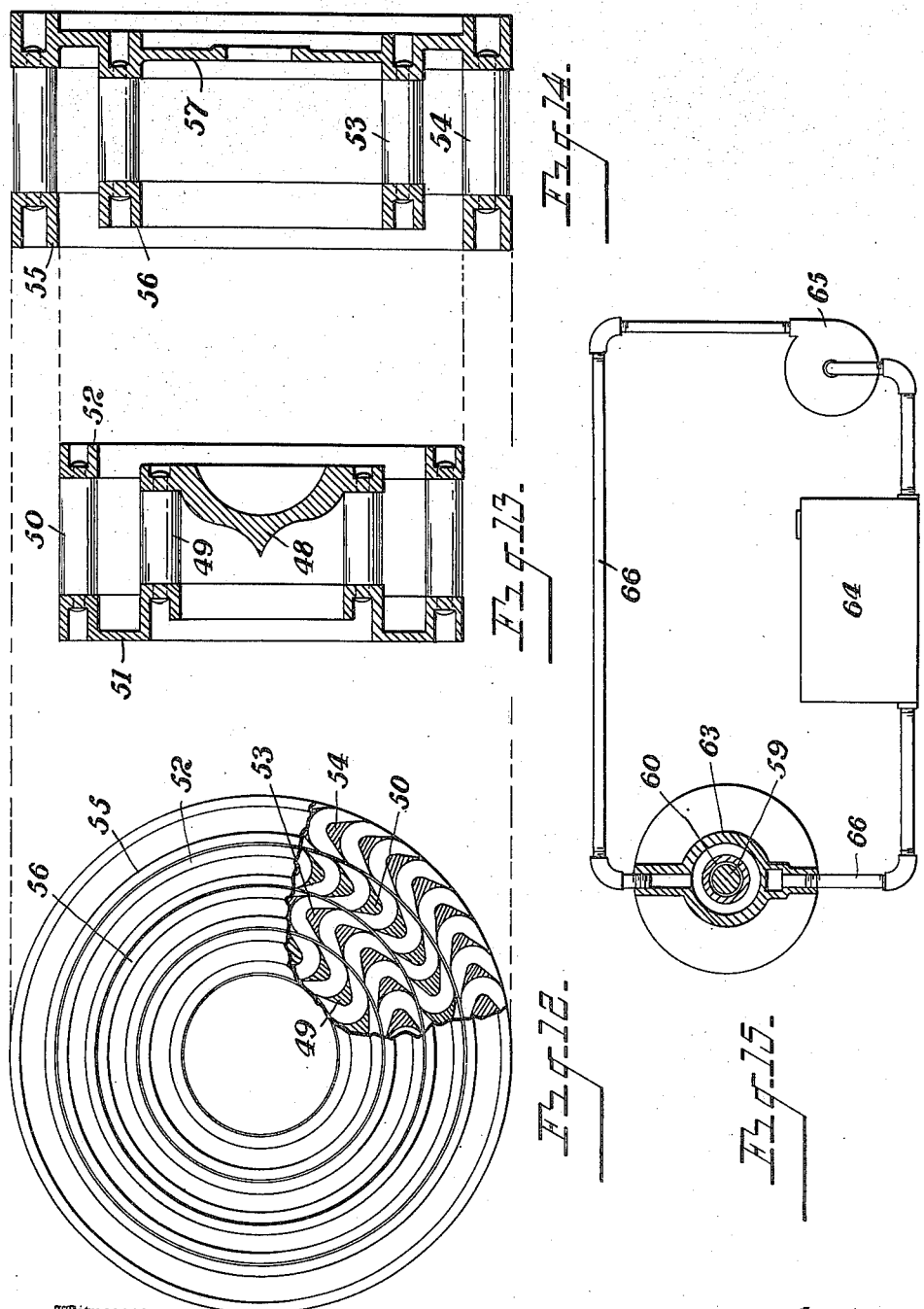

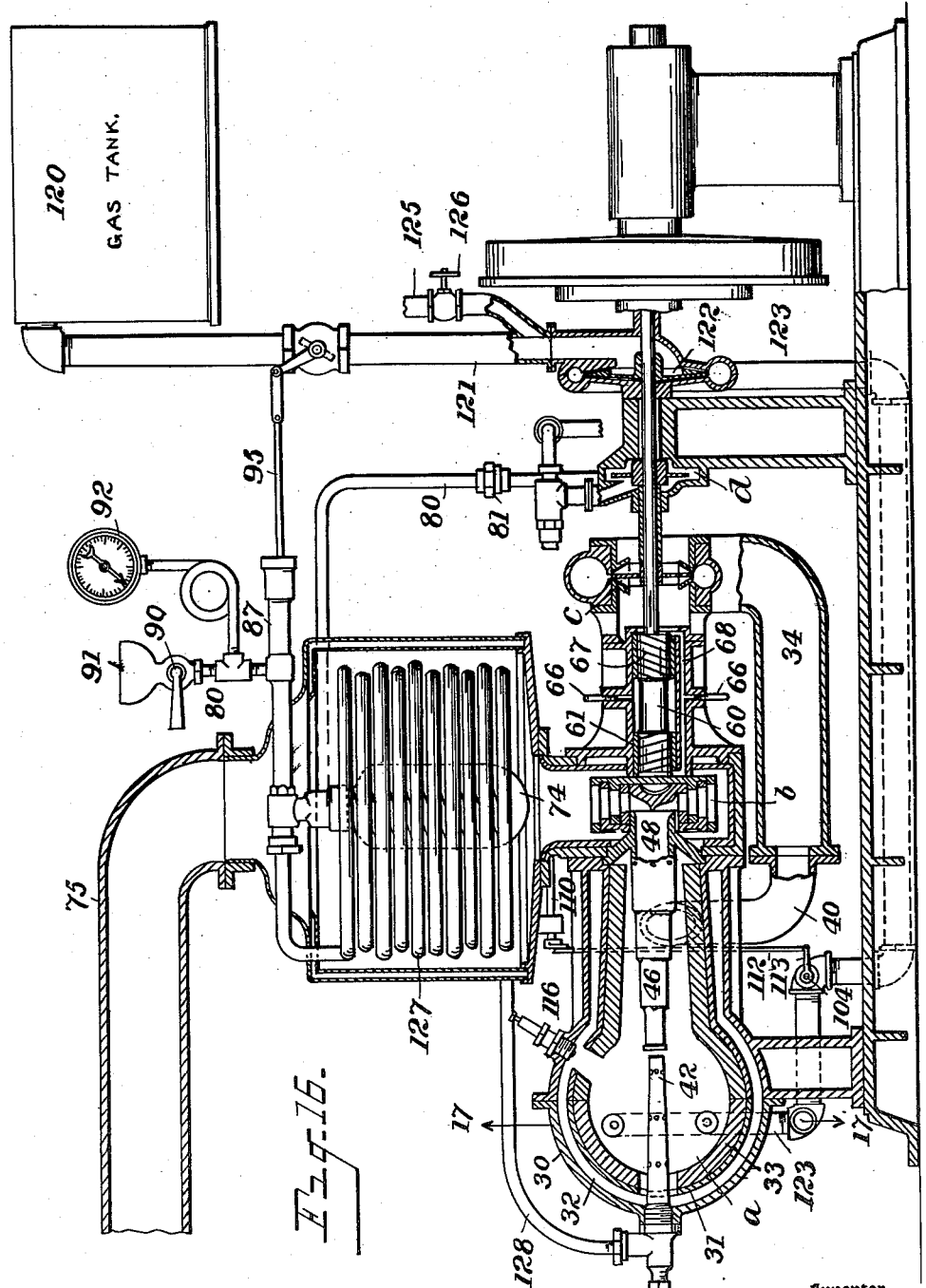

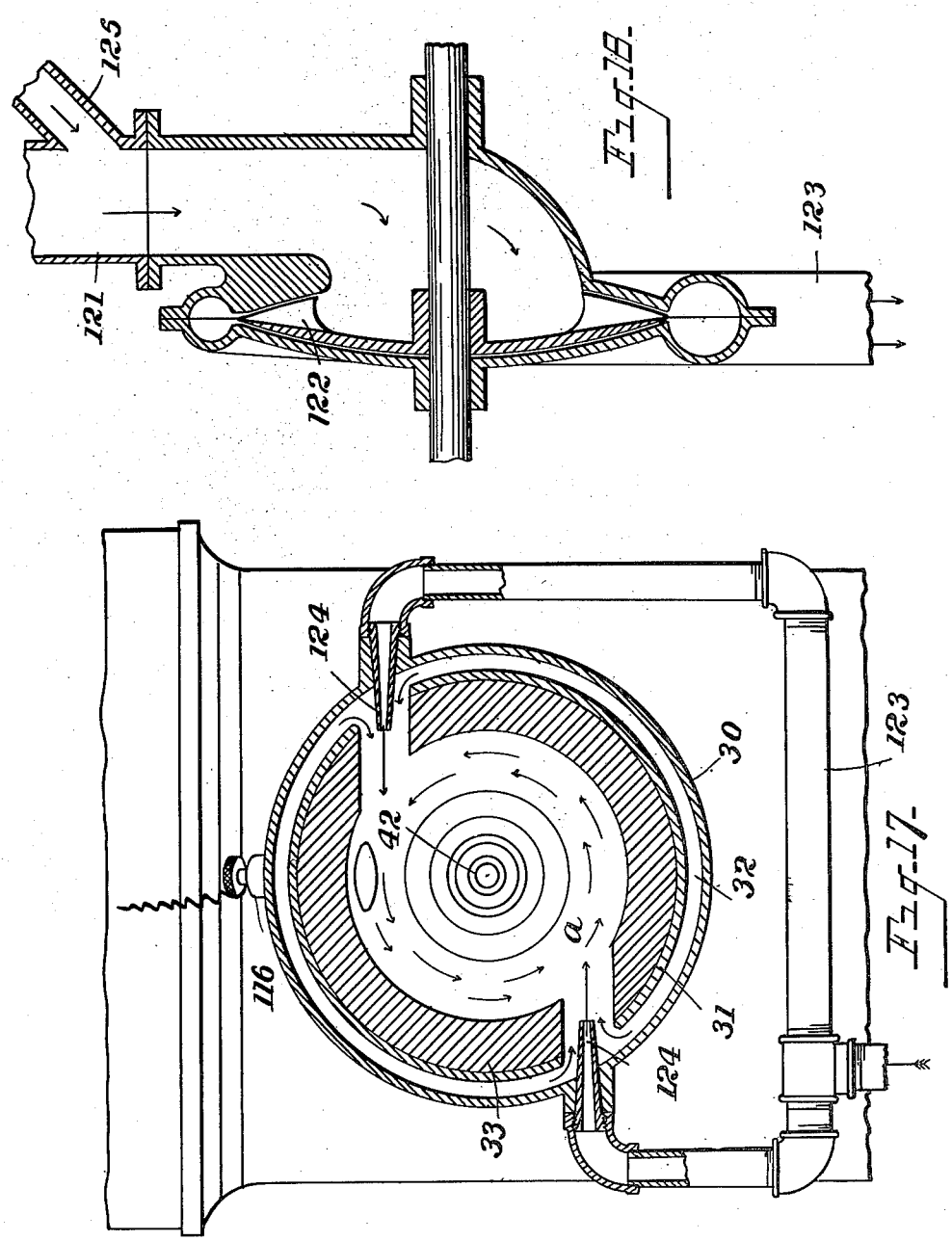

UNITED STATES PATENT OFFICE.

OSCAR P. OSTERGREN, OF DETROIT, MICHIGAN, ASSIGNOR OF SIX-TENTHS TO RUSSELL A. ALGER AND FREDERICK M. ALGER, OF DETROIT, MICHIGAN.

METHOD AND APPARATUS FOR GENERATING MOTIVE POWER.

986,308.  Specification of Letters Patent.  Patented Mar. 7, 1911.

Application filed June 15, 1907. Serial No. 379,237.

*To all whom it may concern:*

Be it known that I, OSCAR P. OSTERGREN, a subject of the King of Sweden, and resident of Detroit, Wayne county, State of Michigan, have invented certain new and useful Improvements in Methods and Apparatus for Generating Motive Power, of which the following is a specification.

The object of the present invention is to generate motive power from liquid or gaseous fluid by means of a rotary motor and with the greatest possible economy of fuel.

The invention includes a novel method of generating motive power and novel apparatus for carrying the method into operation. This apparatus embodies a closed combustion chamber into which superheated steam, air, and hydrocarbon are injected, the mixture so injected being continuously ignited whereby a large amount of gas is produced and a corresponding amount of heat generated. Into this combustion chamber water in regulated quantity is injected, which water is immediately transformed into steam at a high pressure. The mixed steam and gas thus produced in the combustion chamber is used to operate a turbine engine, the rotary member of which is driven at a high rate of speed. The exhaust from the turbine, which is very hot, is utilized to generate steam for the injectors which deliver the hydrocarbon fluid or gas into the combustion chamber, and also to heat the water which is injected into the combustion chamber to form steam. A rotary pump on the shaft of the engine supplies water to the heaters and the pressure in the water pipe leading from the pump, which varies according to the speed of the engine, is used to govern the speed, in the manner hereinafter described. A fan or blower connected with the engine shaft is arranged to furnish air to the combustion chamber. The air thus furnished is highly heated in the casing surrounding the combustion chamber. The apparatus is extremely economical in that a large proportion of heat which is usually wasted in operating hydrocarbon engines is, in the present case, returned to the combustion chamber and utilized in generating steam.

Figure 1 is a general view of the apparatus, in elevation, parts being broken away; Fig. 2 is a vertical section on the line 2—2 of Fig. 1; Figs. 3, 4 and 5 are enlargements of portions of Fig. 2, additional parts being shown in section; Fig. 6 is a section on the line 6 of Fig. 2; Fig. 7 is a section on the line 7 of Fig. 3; Fig. 8 is a plan view partly in section on the line 8—8 of Fig. 7; Fig. 9 is a section on the line 9—9 of Fig. 3; Fig. 10 is a plan view of the rotary pump; Fig. 11 is a section on the line 11—11 of Fig. 10; Fig. 12 is a side view, partly in section, of the turbine; Fig. 13 is a sectional view of the stationary portion of the turbine; Fig. 14 is a similar view of the rotor or rotating portion of the turbine; Fig. 15 is a diagram of the apparatus for circulating cooling and lubricating fluid for the bearings of the turbine shaft; Fig. 16 is a sectional view similar to Fig. 2 illustrating a modified form of the apparatus; Fig. 17 is a section on the line 17—17 of Fig. 16; Fig. 18 is an enlargement of a portion of Fig. 16.

Referring to Figs. 1 and 2 of the drawing, *a* indicates a combustion chamber, *b* a turbine engine, *c* an air pump or blower, *d* a water pump, *e* preheating coils, *f* steam generating coils, *g* a condenser into which the exhaust gases and vapors from the engine pass, and *h* a suitable pump for exhausting the noncondensable gases from the condenser.

When the apparatus is in operation liquid or gaseous fuel, air and steam are continuously injected into the combustion chamber *a* and continuously delivered from said chamber to the turbine engine.

Referring to Figs. 2, 3, 4 and 9, hydrocarbon fluid is delivered through a pipe 25 to nozzles 26, the supply being regulated by valves 27, and steam or air is delivered to the said nozzles through pipes 28, the supply being regulated by valves 29. The apparatus hereinafter described is adapted to deliver steam through the pipes 28 but in some instances air may be utilized, especially for starting.

The combustion chamber has an outer casing 30 and an inner casing 31 separated by an air space 32. Within the inner casing is a fire-resisting lining 33. Air is supplied to the combustion chamber by means of a rotary blower *c*, which, as shown, is arranged directly upon the engine shaft. Air from the blower passes into a tubular chamber 34 in which it is mixed with highly heated steam entering through pipe 35 and injector nozzle 36. The nozzle 36 has inclined openings 37 and it discharges into the smaller end of an expanding tube 38 provided with inclined openings 39 into which a further supply of air is drawn or forced. The mixture of air and steam passes through a pipe 40 (Figs. 2 and 3) and thence into the space 32 between the casings of the combustion chamber in which it is highly heated. This heated mixture of air and steam enters the combustion chamber at the nozzles 26 and it may also enter at the openings for the water inlet and the igniter hereinafter described. A supply of hot water is also injected into the combustion chamber, the supply being limited to the amount which the heat generated by the hydrocarbon is adapted to transform into steam at a high temperature. Thus water from a source to be hereinafter referred to enters through pipe 41 (Figs. 2 and 3) and nozzle 42. The supply of water may be controlled by a hand valve 43 which valve however is preferably provided with a small opening or channel 44 through which a small supply of water may enter when the valve is closed. The nozzle 42 is of the expanding type similar to the nozzle 36 and is provided with a series of inclined openings 45 into which the heated gases from the combustion chamber are drawn to convert the water into steam. The nozzle 42 discharges into an expanding tube 46 having a series of inclined openings 47 into which a further supply of heated gas and steam passes. The tube 46 leads from the combustion chamber to the turbine $b$, discharging against a cone 48 at the center of the turbine which cone directs the gases radially outward.

Referring to Figs. 4, 12, 13 and 14, 49 and 50 indicate the stationary vanes of the turbine, which vanes are connected to the cone 48 and to the rings 51 and 52. Between the vanes 49 and 50 are a series of movable vanes 53 and surrounding the vanes 50 are a second series of movable vanes 54. The movable vanes 53 and 54 are connected to rotating rings 55, 56, and to a disk or spider 57. The turbine described operates in the usual manner, it being understood that there are sufficient clearances between the rotating and stationary parts to permit of the rotating member or rotor turning freely. The present invention is not limited to any particular form of turbine and any suitable engine of this kind may be substituted.

The disk 57 of the rotary member of the turbine is connected to the head 58 of the engine shaft 59 (Figs. 3 and 4). It is desirable to permit of a slight degree of flexibility in the engine shaft in order that the center of gravity of the rotor may adjust itself to the center of rotation so that the rotor may be perfectly balanced. To permit of this flexibility a sleeve 60 is mounted in fixed bearings 61 and the shaft 59 is centrally arranged in the sleeve and connected thereto rigidly at the end of the sleeve farthest from the engine. As shown this connection is by means of a tapered portion 62 of the shaft fitting a tapered opening in the end of the sleeve farthest from the motor, the shaft being free from the remaining portion of the sleeve. The sleeve and its bearings are within a closed casing 63 (Figs. 2, 4 and 15) through which water or other cooling fluid is circulated. This circulating system may consist, as shown in Fig. 15, of a tank or radiator 64, a pump 65 and suitable piping 66. Water enters the upper side of the casing and works outwardly between the sleeve and its bearings through spiral grooves 67 (Figs. 2 and 4) to the ends of the sleeve and thence through a channel 68 and pipe 66 to the reservoir. The fluid thus circulated serves a double purpose of lubricating the bearings of the shaft and keeping the shaft and its casing cool. As is usual, the shaft is driven at a high rate of speed and the speed may be reduced as desired by suitable gearing 69.

Referring to Figs. 1, 2, 3 and 6, 70 indicates the casing in which the motor runs and into which it exhausts. The exhaust from the motor passes upward through a chamber 71 in which are the two coils $e$, $f$, and a vessel or boiler 74 arranged within the coils. After passing the coils and the boiler the exhaust gases pass through flue 75 to the condenser $g$ in which the steam is condensed. The non-condensable gases and the water of condensation are pumped off through pipe 76 by the pump $h$. The condenser is of ordinary construction and is supplied with cold water through pipe 77, which water discharges through pipe 78.

Referring to Figs. 2 to 5 inclusive and Figs. 10 and 11, water enters the pump $d$ through pipe 79 and is discharged through pipe 80 under considerable pressure due to the high velocity of the rotary member of the pump, which member is carried by the motor shaft 59. The pipe 80 contains a check valve 81 which holds the water in the pipe when the motor is stopped. The pipe 80 discharges directly into the boiler or heating vessel 74 and the water, when sufficiently heated, discharges from the boiler through a vertical pipe 82 which is closely fitted in the top of the boiler and extends nearly to the bottom thereof. Pipe 82 discharges into a transverse tube 83 which opens into a pipe 84, the opening being normally closed by a valve 85. (Fig. 5.) Valve 85 is connected by a rod or stem to a piston 86, operating in a cylinder 87. A spring 88 tends to close the valve 85 while the pressure generated in the boiler 74, bearing on the piston, tends to open said valve. As steam is generated in the boiler 74 the pressure opens the valve 85 and water is discharged through the pipe 84 until the steam pressure becomes sufficiently reduced in the boiler and when the engine is running steadily the discharge will be more or less uniform due to the constant heat to which the boiler is subjected. Connected with the tube 83 is a filling tube 89 which is normally closed by a valve 90. Connected with the filling tube is a funnel 91 and a pressure indicator 92, adapted to indicate the pressure in the boiler 74. The hot water thus discharged from the boiler 74 passes through the coil $e$, (Figs. 5 and 6) and a portion of it thence through the pipe 41 to the nozzle 42 (Fig. 3) hereinbefore described.
Referring to Figs. 2, 5 and 6, 93 indicates a valve controlling the inlet to the coil $f$. This valve is connected by a lever 94 with a rod 95 connected to the piston 86. The connection between lever 94 and rod 95 may be adjusted by suitable thumb nuts 96. Communicating with the valve 93 is an inlet pipe 97, admitting hot water from the coil $e$. When the valve 85 is opened the valve 93 is more or less closed and when the valve 85 closes the valve 93 is opened to the extent permitted by the connection between the lever 94 and the rod 95. When the apparatus is in operation, the coil $f$ is very hot and is practically what is termed a flash boiler. That is, the water entering it is immediately turned into steam and superheated. The superheated steam is discharged from the coil $f$ into the pipe 35, previously referred to, and into a pipe 98 which communicates through a three-way cock 99 with the pipe 28 leading to the nozzles 26. In the pipe 98 is a suitable check valve 100. An air tank 101 (Fig. 2) is connected by a pipe 102 with the three-way cock 99, the pipe 102 being provided with a check valve 103. A branch pipe 117 extends from the pipe 102 to the fuel tank (not shown) from which the supply of liquid fuel is derived through pipe 25. In the fuel supply pipe 25 is a valve 104 which is automatically controlled by a thermostat. As shown in Figs. 2, 3 and 6, the thermostat consists of a metal rod 105 extending across the exhaust chamber 70, one end of the rod being fixed to the wall of the chamber and the other end bearing upon an arm 106 of a rock shaft 107. An arm 108 of the rock shaft is connected with an arm 109 of a second rock shaft 110 and an arm 111 on the latter shaft is connected by a link 112 with the lever arm 113 of the valve 104. When the heat in the exhaust chamber 70 exceeds a certain limit the thermostat expands and partially closes the valve 104, thus restricting the supply of fuel to the combustion chamber.

On starting the apparatus the gases from the combustion chamber are permitted to pass around the motor through a passage 114 which extends from the combustion chamber $a$ to the exhaust chamber 70. This passage or by-pass 114 is controlled by a valve 115. The combustion chamber is provided with suitable ignition devices. A continuous jump spark igniter 116 (Fig. 2) may be used, the same being provided with the usual battery and coil.

The mode of starting the apparatus and the operation thereof is as follows: In starting, the by-pass 114 from the combustion chamber to the exhaust chamber, is left open until a sufficient supply of steam and gas for operating the motor is generated. The boiler 74 is filled with water through the funnel 91 and valve 90 and the valve is then closed. The three-way cock 99 is then turned to admit air under pressure from the tank 101 to the nozzles 26 and the valve in pipe 117 is opened to permit air pressure to act upon the fuel in the tank (not shown) to force the same upward through the pipe 25 to the nozzles 26. The igniter being started gas will be generated in the combustion chamber which will travel through the by-pass 114, the exhaust passage 70 and through the coils $f$ and $e$ and around the boiler 74, passing eventually to the condenser. As soon as the boiler 74 is sufficiently heated hot water will automatically be delivered to the nozzle 42 following which steam will be generated in the combustion chamber. When sufficient flow of gas and steam is being produced the by-pass is closed and the steam and gases are directed through the motor. After starting the motor the pump $c$ will deliver air through the pipe 40 to the space 32 surrounding the combustion chamber and thence to the combustion chamber. The three-way cock may then be turned to cut off the air from the tank 101 and establish connection between the coil $f$ and the nozzles 26, thus admitting superheated steam to the nozzles in lieu of air. The pump $d$ will deliver water continuously through the pipe 80 to the boiler 74, and thereafter the operation of the apparatus will be automatic. The pump will in a measure serve as a governor as the pressure from the pump is transmitted to the boiler 74 and thence to the piston 86 and valve 93, cutting off the supply of water to the lower coil $f$ when the speed of the engine becomes excessive, and thus cutting off the steam to the ejector nozzles 26, which has the effect of reducing the flow of liquid fuel through said nozzles, the liquid fuel being drawn into the nozzles in proportion to the pressure of steam or air in the pipe 28. The apparatus is further governed by the thermostat 105 which reduces the flow of liquid fuel through the pipe 25 when the temperature of the exhaust gases becomes excessive. The hydrocarbon and steam are introduced into and mixed in the nozzle 26 and discharged into the combustion chamber $a$. The use of steam especially when superheated as in this case is very beneficial for obtaining a smokeless and perfect combustion, as it will disintegrate into oxygen and hydrogen in the first stage of high temperature whereupon the free oxygen will later on easily unite with any free carbon present. The free hydrogen will also unite with any surplus oxygen at a somewhat lower temperature. Hot air is drawn in, as shown in Fig. 9, from the hot jacketed space 32 and unites with the steam and hydrogen to obtain good combustion. Hot water is introduced through the valve 44 into the combined vaporizing and expansion nozzle 42, 46. The water enters through the valve 43 with high velocity due to the high pressure and the issuing jet of water will immediately be turned into a jet of steam which will during its passage through the nozzle absorb the hot gases surrounding the same and entering through the apertures 45, 47. The mixture will during its rush toward the turbine wheel continually increase in speed as the velocity of the steam increases due to the added heat and expansion of the nozzle, or in other words, the heat energy is gradually turned into kinetic energy. The function of the steam admitted through the pipe 40 into the offset portion of the combustion chamber performs in part the function of a cooling medium to reduce the temperature of the steam and hot vapors which strike the turbine vanes to a working temperature. This steam and hot air as well as the hot gases in the combustion chamber enter the expansion nozzle 42, 46 through the apertures 45 and 47 and also through the annular space between the sections 42 and 46.

The economy of the apparatus is enhanced by the return of a large proportion of the heat which is imparted to the water in the coils and the boiler 74. Further economy is effected by means of the condenser $g$ which tends to create a vacuum on the exhaust side of the apparatus.

Fig. 16 represents a form of the power generating apparatus in which gas is used for fuel. Referring to this figure and to the sectional views in Figs. 17 and 18, 120 indicates a source of gas supply from which gas is drawn through pipe 121 by a blower 122, the gas being forced by the blower through pipe 123 to nozzles 124. The rotary member of the blower 122 is mounted on the engine shaft as clearly shown in Figs. 16 and 18. A suitable amount of air is combined with the gas, the air being supplied through pipe 125 which is controlled by a valve 126.

In the apparatus shown in Fig. 16, a single coil 127 is shown in the exhaust passage above the engine, the said coil being supplied with water in the manner in which coil $e$, heretofore referred to, is supplied. The hot water from coil 127 is conveyed through the pipe 128 to the nozzle 42.

The flow of gas in pipe 121 may be governed by a valve connected with the rod 95, Figs. 5 and 16, the connections being arranged so that the valve will close more or less as the pressure increases or diminishes in the boiler 74.

Except as above noted, the apparatus illustrated in Figs. 16, 17 and 18, is substantially the same as that shown in Figs. 1 to 15 inclusive and operates in the same manner and hence the same reference figures have been used to designate parts common to the above forms of the apparatus.

Having described my invention what I claim and desire to secure by Letters-Patent is, 1. The method of generating motive power which consists in continuously introducing a mixture of hydrocarbon fuel and steam into a combustion chamber, continuously introducing air and mixing it with the hydrocarbon and steam, continuously igniting the mixture, continuously introducing a jet of water into the ignited mixture, continuously introducing a cooling gas into the mixture so formed, and utilizing the energy of the resultant gas so formed in a transformer of energy.

2. The method of generating motive power which consists in continuously introducing a mixture of hydrocarbon fuel and steam into a combustion chamber, continuously introducing heated air and mixing it with the hydrocarbon and steam, continuously igniting the mixture, continuously introducing a jet of water into the ignited mixture, continuously introducing steam into the mixture so formed, and utilizing the energy of the resultant gas so formed in a transformer of energy.

3. The method of generating motive power which consists in continuously introducing a mixture of hydrocarbon fuel and steam into a combustion chamber, continuously igniting the mixture, continuously introducing a jet of water under high pressure into and in the direction of flow of the ignited mixture to vaporize the same, continuously introducing another gas to the mixture of gases so formed, and utilizing the kinetic energy of the resultant gas in a transformer of energy.

4. In an apparatus for generating motive power, the combination of an engine, a combustion chamber, means for injecting air and fuel into said combustion chamber, means for injecting steam therein, means for conducting the steam and gases from said combustion chamber to the engine, a steam generating device in the exhaust passage of the engine and arranged to discharge into said combustion chamber, and a water heating device also located in the said exhaust passage and arranged to discharge a jet of water into the combustion chamber.

5. In an apparatus for generating motive power, the combination with a rotary engine, of a combustion chamber, means for injecting hydrocarbon fuel, air and water into said chamber, means for conducting the steam and gases from said chamber to said engine, an exhaust passage from the engine, a condenser arranged to receive steam and gases from said exhaust passage, means for exhausting the non-condensable gases from the condenser, and means in said exhaust passage for pre-heating the water delivered to said combustion chamber.

6. In an apparatus for generating motive power, the combination with a rotary engine, of a combustion chamber, means for injecting hydrocarbon fuel, air and water into said chamber, means for conducting the steam and gases from said chamber to said engine, an exhaust passage from the engine, a condenser arranged to receive the steam and gases from said exhaust passage, means for exhausting the non-condensable gases from the condenser, means in said exhaust passage for producing steam, and means for delivering said steam to the fuel injectors.

7. The combination with a turbine engine and means for producing a continuous supply of gas and steam therefor, of a governing device comprising a water pump operated by the turbine, a piston subject to the pressure of water delivered by said water pump, a valve connected with said piston, and a water supply to the steam generator controlled by said valve.

8. In an apparatus for generating motive power, a combustion chamber having a surrounding air space for pre-heating the air, means for injecting preheated air from said air space and hydrocarbon fuel into the combustion chamber, an expanding nozzle in the combustion chamber means for injecting a jet of water into said nozzle, means for continuously igniting the mixture in said combustion chamber, a turbine engine, and means for conveying the steam and gases from said combustion chamber to said engine.

9. In an apparatus for generating motive power, the combination with the combustion chamber and means for injecting air and hydrocarbon fuel therein, of a turbine engine, an expanding tube within the combustion chamber having a series of perforations, said tube leading to the engine, and means for discharging water into said combustion chamber comprising a nozzle discharging into said tube.

10. In an apparatus for generating motive power, the combination with a combustion chamber, and means for injecting air and hydrocarbon fuel therein, of means for supplying water to said chamber comprising a valve having a permanent passage therethrough, whereby a limited amount of water is supplied to the combustion chamber when the valve is closed.

11. In an apparatus for generating motive power, the combination with the combustion chamber and the engine communicating therewith, of the coils arranged in the exhaust passage of the engine, a connection between one of said coils and the combustion chamber through which steam is supplied, a connection between the other coil and the combustion chamber through which water is supplied, and automatic means for regulating the supplies of water and steam to the combustion chamber.

12. In an apparatus for generating motive power, the combination with the combustion chamber and the engine communicating therewith, of the coils arranged in the exhaust passage of the engine, a connection between one of said coils and the combustion chamber through which steam is supplied, a connection between the other coil and the combustion chamber through which water is supplied, and automatic means governed jointly by the speed of the engine and the temperature of the exhaust for regulating the amounts of steam and air delivered to the combustion chamber.

13. In an apparatus for generating motive power, the combination with the combustion chamber and the engine communicating therewith, of the coils arranged in the exhaust passage of the engine, means for supplying water to one of said coils, means for supplying water from the first named coil to a second coil in regulated quantities, and a steam pipe leading from said second coil to the combustion chamber.

14. In an apparatus for generating motive power, the combination with the combustion chamber and the engine communicating therewith, of two coils arranged in the exhaust passage of the engine, one of said coils being used to preheat water and the other coil to generate steam, automatic means for feeding water in regulated quantities from the heating coil to the steam generating coil, and means for conducting steam from the latter coil to the combustion chamber.

15. In an apparatus for generating motive power, the combination with the combustion chamber and the engine communicating therewith, of two coils arranged in the exhaust passage of the engine, one of said coils being used to preheat water and the other coil to generate steam, automatic means controlled by the heat of the exhaust for feeding water in regulated quantities from the heating coil to the steam generating coil, and means for conducting steam from the latter coil to the combustion chamber.

16. In an apparatus for generating motive power, the combination with an engine, of a chamber, a vaporizing and expansion nozzle extending in and along the chamber and leading to the engine, means for discharging a jet of water within the nozzle, and means for maintaining a hot gas within the chamber.

17. In an apparatus for generating motive power, the combination with an engine, of a chamber, a vaporizing and expansion nozzle extending in and along the chamber and leading to the engine, means for discharging a jet of water within and longitudinally of the nozzle, and means for maintaining a hot gas within the chamber.

18. In an apparatus for generating motive power, the combination with an engine, of a chamber, a vaporizing and expansion nozzle, provided with a series of perforations, extending in and along the chamber and leading to the engine, means for discharging a jet of water within and longitudinally of the expansion nozzle, and means for maintaining a hot gas within the chamber.

19. In an apparatus for generating motive power, the combination with an engine, of a combustion chamber, means for injecting an explosive mixture therein, means for igniting the mixture, an expansion nozzle extending in and along the combustion chamber and leading to the engine, and means for discharging a jet of water within and longitudinally of the expansion nozzle.

20. In an apparatus for generating motive power, the combination with an engine, of a combustion chamber, means for injecting an explosive mixture therein, means for igniting the mixture, an expansion nozzle, provided with a series of perforations, extending in and along the combustion chamber and leading to the engine, and means for discharging a jet of water within and longitudinally of the expansion nozzle.

21. The combination with a chamber, of means for maintaining a hot gas within the chamber, a vaporizing and expansion nozzle extending in and along the chamber, and means for discharging a jet of water within and longitudinally of said nozzle.

22. The combination with a chamber, of a combined vaporizing and expansion nozzle extending in and along the chamber, said nozzle comprising an expanded tube, a second expanded tube discharging into the first tube, and means for discharging a jet of water into the second tube.

23. The combination with a chamber, of a combined vaporizing and expansion nozzle extending in and along the chamber, said nozzle comprising an expanded tube provided with perforations, a second expanded tube provided with perforations and discharging into the first tube and constructed so as to leave a free annular space between the tubes, and means for discharging a jet of water into the second tube.

24. The combination with a chamber, of a combined vaporizing and expansion nozzle extending in and along the chamber, said nozzle including an expanded tube, a second expanded tube discharging into the first tube and constructed so as to leave a free annular space between the tubes, said tubes being provided with perforations inclined in the direction of their axis.

25. The combination with a combustion chamber having an offset portion, of means for injecting a combustible mixture in the combustion chamber, means for igniting the mixture, a perforated vaporizing and expansion nozzle extending in and along the combustion chamber and the offset portion, means for injecting a jet of water within the nozzle, and means for discharging steam into the offset portion.

26. The combination with an engine, of a combustion chamber having an offset portion, means for injecting a combustible mixture into the combustion chamber, means for igniting the mixture, a perforated vaporizing and expansion nozzle extending in and along the combustion chamber and the offset portion and leading to the engine, means for injecting a jet of water within and longitudinally of the nozzle, and means for discharging the exhaust from said engine into the offset portion.

27. The combination with a combustion chamber, of means for injecting a combustible mixture into the combustion chamber, means for igniting the mixture, a perforated vaporizing and expansion nozzle extending in and along the combustion chamber, means for injecting a jet of water within and longitudinally of the nozzle, an air chamber, a second expansion nozzle, provided with perforations, passing through the air chamber and leading to the combustion chamber, and means for discharging steam into the second expansion nozzle.

28. The combination with a combustion chamber of circular cross section, of an expanding nozzle extending into the combustion chamber, a nozzle constructed to discharge a combustible mixture tangentially into the chamber so as to set the mixture in rotation therein about the expanding nozzle, and means for discharging steam into the nozzle.

29. The combination with a combustion chamber of circular cross section, of an air inlet, a nozzle constructed to discharge a combustible mixture through the air inlet and tangentially in the chamber so as to set the combustible mixture and air in rotation therein.

30. The combination with a combustion chamber of circular cross section having an air inlet, of a nozzle constructed to discharge a combustible mixture tangentially into the chamber so as to set the mixture in rotation therein, and for supplying air under pressure to the air inlet so as to discharge the air tangentially into the combustion chamber.

31. The combination with a combustion chamber of circular cross section, of an air jacket surrounding the chamber, an air inlet between the jacket and chamber, and a nozzle constructed to discharge a combustible mixture tangentially into the chamber so as to set the mixture and air in rotation therein.

32. The combination with a combustion chamber of circular cross section, of an expanding nozzle provided with perforations and extending axially of the combustion chamber, a nozzle constructed to discharge a combustible mixture tangentially in the chamber so as to set the mixture in rotation therein about the expanding nozzle, means for igniting the mixture, and means for discharging steam into the nozzle.

33. In an apparatus of the class described, in combination a combustion chamber, a vaporizing and expansion nozzle extending in and along the combustion chamber, means for continuously injecting a combustible mixture into the chamber, means for continuously igniting the mixture, and means for continuously introducing a jet of water within and longitudinally of the nozzle.

34. In an apparatus of the class described, in combination a combustion chamber, a vaporizing and expansion nozzle provided with apertures and passing through the combustion chamber, means for continually injecting a combustible mixture into the chamber, means for continually igniting the mixture, and means for continually introducing a jet of water into the nozzle.

35. In an apparatus of the class described, in combination a combustion chamber having an offset portion, a vaporizing and expansion nozzle provided with apertures and passing through the combustion chamber and the offset portion, means for continually injecting a combustible mixture into the combustion chamber, means for continually igniting the mixture, means for continually introducing a jet of water into the nozzle, and means for continually introducing steam into the offset portion.

36. The combination with a combustion chamber, of means for injecting hydrocarbon fuel into said combustion chamber, an air chamber, an expansion nozzle provided with perforations, passing through said air chamber and leading to the combustion chamber, and means for discharging steam into the expansion nozzle.

37. In an apparatus for generating motive power, the combination with an engine, of a chamber, a vaporizing and expansion nozzle extending in and along the chamber and leading to the engine, means for discharging a jet of water within the nozzle, means for maintaining a hot gas within the chamber, and means for discharging the exhaust from said engine into the chamber.

38. In an apparatus for generating motive power, the combination with an engine, of a chamber, an expansion nozzle extending in and along said chamber and leading to the engine, means for discharging motive fluid within said nozzle, means for discharging the exhaust from the engine into said nozzle, and means for maintaining a hot gas within the chamber.

39. In an apparatus for generating motive power, the combination with an engine, of a combustion chamber, means for supplying a combustible mixture to said chamber, means for igniting said mixture, an expansion nozzle extending in and along said chamber and leading to the engine, means for supplying motive fluid to said nozzle, and means for discharging the exhaust from the engine into said nozzle.

40. In an apparatus for generating motive power, the combination with an engine, of a chamber, a perforated expansion nozzle extending in and along said chamber and leading to the engine, means for supplying motive fluid to said nozzle, means for discharging the exhaust from said engine into said chamber, and means for maintaining a hot gas within said chamber.

41. In an apparatus for generating motive power, the combination with an engine, of a chamber, a perforated expansion nozzle extending in and along said chamber and leading to the engine, means for supplying motive fluid to said nozzle, and means for maintaining a hot gas in said chamber.

42. In an apparatus for generating motive power, the combination with an engine, of a combustion chamber, means for supplying a combustible mixture to said chamber, means for igniting said mixture, an expansion nozzle extending in and along said chamber and leading to the engine, and means for supplying motive fluid to said nozzle.

In testimony whereof I affix my signature in presence of two witnesses.

OSCAR P. OSTERGREN.

Witnesses:
G. H. STALKER,
ARTHUR E. SUTPHIN.